United States Patent [19]

Takahashi et al.

[11] Patent Number: 5,708,636
[45] Date of Patent: Jan. 13, 1998

[54] TRACKING ERROR SIGNAL GENERATION DEVICE

[75] Inventors: Hiroyuki Takahashi; Shinichi Nagahara; Fumikazu Tahata; Hidehiro Ishii; Eiji Muramatsu; Akiyoshi Inoue, all of Tokorozawa, Japan

[73] Assignee: Pioneer Electronic Corporation, Tokyo-to, Japan

[21] Appl. No.: 655,753

[22] Filed: May 30, 1996

[30] Foreign Application Priority Data

May 31, 1995 [JP] Japan ............................. 7-134439

[51] Int. Cl.$^6$ .................................................. G11B 7/09
[52] U.S. Cl. .......................... 369/44.41; 369/44.26; 369/44.29
[58] Field of Search ....................... 369/44.41, 44.42, 369/44.37, 44.38, 44.26, 44.27, 44.29, 58, 44.34

[56] References Cited

U.S. PATENT DOCUMENTS 4,787,076  11/1988  Deguchi et al. ............... 369/58
5,216,652  6/1993  Yoshio et al. ............... 369/44.41
5,235,583  8/1993  Jungenelis et al. ........... 369/44.26
5,619,482  4/1997  Tezuka et al. ............... 369/44.41

*Primary Examiner*—Thang V. Tran
*Attorney, Agent, or Firm*—Nixon & Vanderhye P.C.

[57] ABSTRACT

A tracking error signal generation device is used for an optical pickup device capable of reproducing and/or recording an information signal on a spiral or coaxial signal track of a disk shaped optical record medium of one type among a plurality of optical record media of different types which track pitches are different from each other. The optical pickup device has a light beam irradiation device for irradiating the optical record medium with three light beams; and light detection devices for receiving a reflection light of each light beam. The tracking error signal generation device is provided with: a first operation device for calculating a first tracking error signal according to the three beams method; a second operation device for calculating a second tracking error signal according to a DPP (Differential Push Pull) method; and a selecting device for selecting one of the first tracking error signal and the second tracking error signal on the basis of an instruction from the external.

6 Claims, 9 Drawing Sheets

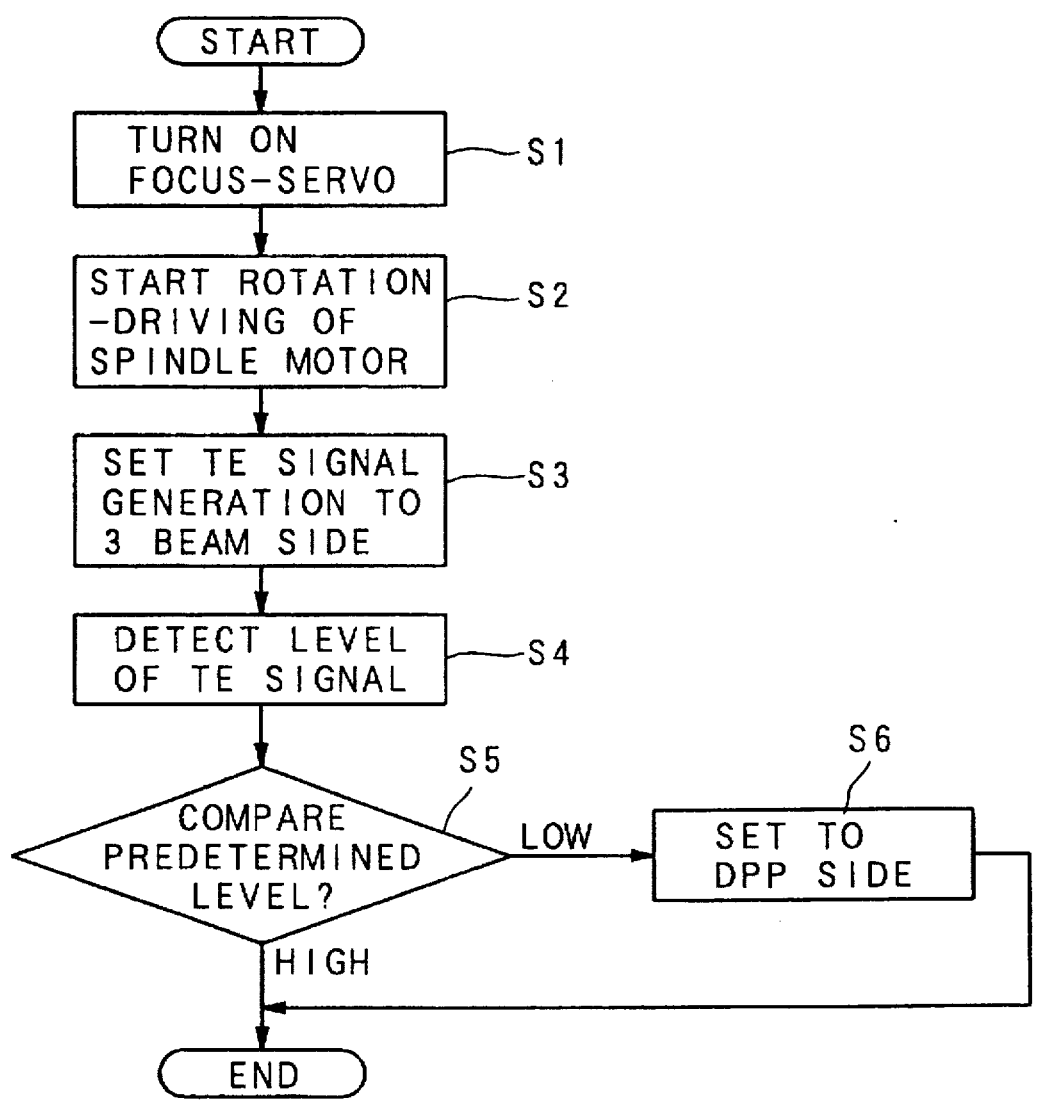

TRACKING ERROR SIGNAL GENERATION DEVICE

BACKGROUND OF THE INVENTION

1. Field of the Invention

The present invention generally relates to a tracking error signal generation device used in an apparatus for reproducing and/or recording an optical record medium, and more particularly to a tracking error signal generation device used in an apparatus for reproducing and/or recording an optical record medium of one type among various types which track pitches are different from each other.

2. Description of the Related Art

In the apparatus for recording the information onto an optical record medium such as a CD (Compact Disk), a LD (Laser Disk), a DVD (Digital Video Disk) etc., by use of a light beam, and the apparatus for reproducing the information from such an optical record medium by use of the light beam, the light beam should precisely follow the signal track in order to record and/or reproduce the information correctly.

For this purpose, the tracking control to generate a tracking error signal indicating a shift of the light beam from the desired signal track and reduce the shift on the basis of the generated tracking error signal is performed in this kind of apparatus for recording and/or reproducing the optical record medium.

As one method of generating the tracking error signal, there is the "3 beams method".

The 3 beams method is such a method that three beams i.e. a main beam for recording or reproducing the information, a first sub beam for moving ahead of the main beam to generate the tracking error signal, and a second sub beam for moving behind the main beam to generate the tracking error signal are used, which are arranged such that a straight line connecting the centers of those 3 beams forms a predetermined angle corresponding to the track pitch of the signal track with respect to the information reading direction. Further, at the position corresponding to the reflection light of each of the first and second sub beams from the optical record medium, the light receiving surface of the light detection element is disposed respectively.

By this, if the main beam is substantially on the center line of the signal track, the incident (reflection) light amount to the light detection element corresponding to the first sub beam and the incident (reflection) light amount to the light detection element corresponding to the second sub beam are substantially equal to each other, so that the difference between them substantially becomes zero. Thus, it can be found that the main beam is substantially on the center line of the signal track at this moment.

On the contrary, if the main beam is at a position shifted from the center line of the signal track, the incident (reflection) light amount to the light detection element corresponding to the first sub beam and the incident (reflection) light amount to the light detection element corresponding to the second sub beam are unbalanced and different from each other. Thus, by checking the sign and the value (magnitude) of the difference between them, it can be found in which direction and how much magnitude the main beam is shifted from the center line of the signal track at this moment.

As a result, the tracking control can be performed by moving the light beams in the direction to reduce the shift.

In the tracking control by means of the above explained 3 beams method, there exists an optimum beam arrangement in dependence on the track pitch of the signal track. Thus, in a compatible information recording apparatus, a compatible reproducing apparatus, a compatible information recording and reproducing apparatus for recording and/or reproducing the information with respect to various types of optical record media, which track pitches are different from each other, it is necessary to employ a plurality of optical systems capable of obtaining various optimum beam arrangements correspondingly. This results in that the number of adjusting members in the apparatus is increased, and the operation required for the adjustment is also increased, which is the problem.

As another method of generating the tracking error signal, there is the "DPP (Differential Push Pull) method". In this DPP method, the tracking error signal is calculated out of the light detection signals obtained from a plurality of light beams, which generate push pull signals different in phase from each other such that the in phase offset component due to the disk skew and the movement of the objective lens can be canceled. However in this method, there still exists the optimum beam arrangement in dependence on the track pitch of the signal track in the way similar to the aforementioned 3 beams method. Thus, the aforementioned problem is still raised.

As another method of generating the tracking error signal, there is the "heterodyne method". In this heterodyne method, the phase of the heterodyne signal obtained by four divided light receiving surfaces of the light detection element is detected with respect to the RF signal as the standard, and the radial error signal of both polarities is generated. However in this method, there still exists the optimum beam arrangement in dependence on the track pitch of the signal track in the way similar to the aforementioned 3 beams method. Thus, the aforementioned problem is still raised.

SUMMARY OF THE INVENTION

It is therefore an object of the present invention to provide a tracking error signal generation device, which can simplify the construction and adjustment of the optical pickup used in the compatible reproducing apparatus, the compatible recording apparatus and the compatible recording and reproducing apparatus which deal with the optical record medium of one type among various types which track pitches are different form each other.

The above object of the present invention can be achieved by a first tracking error signal generation device used for an optical pickup device capable of reproducing and/or recording an information signal on a spiral or coaxial signal track of a disk shaped optical record medium of one type among a plurality of optical record media of different types which track pitches are different from each other. The optical pickup device is provided with: a light beam irradiation device for irradiating the optical record medium with a main beam for forming a main beam spot on the signal track, a first sub beam for forming a first sub beam spot on the optical record medium ahead of the main beam spot and a second sub beam for forming a second sub beam spot behind the main beam spot; a first light detection device having at least two light receiving surfaces which are divided by a boundary line substantially parallel to a tangent direction of the signal track for receiving a reflection light of the first sub beam and outputting first and second light detection signals S1 and S2 indicating light amounts received by the two light receiving surfaces thereof respectively; a second light detection device having at least two light receiving surfaces which are divided by a boundary line substantially parallel to the tangent direction for receiving a reflection light of the main beam and outputting third and fourth light detection signals S3 and S4 indicating light amounts received by the two light receiving surfaces thereof respectively; and a third light detection device having at least two light receiving surfaces which are divided by a boundary line substantially parallel to the tangent direction for receiving a reflection light of the second sub beam and outputting fifth and sixth light detection signals S5 and S6 indicating light amounts received by the two light receiving surfaces thereof respectively.

The first tracking error signal generation device is provided with: a first operation device, to which the first, second, fifth and sixth light detection signals S1, S2, S5 and S6 are inputted, for adding the first and second light detection signals S1 and S2 to output its result as a first addition signal, adding the fifth and sixth light detection signals S5 and S6 to output its result as a second addition signal, and subtracting one of the first and second addition signals from the other to output its result as a first tracking error signal according to a three beams method; and a second operation device, to which the first to sixth light detection signals S1 to S6 are inputted, for calculating a second tracking error signal SE according to a DPP (Differential Push Pull) method expressed by an expression (1), in case that the light receiving surfaces respectively corresponding to the first and fifth light detection signals S1 and S5 are arranged on one straight line including the radius of the optical record medium at positions corresponding to directions same to each other of the signal track with respect to the boundary line, and that the light receiving surfaces respectively corresponding to the second and sixth light detection signals S2 and S6 are arranged on another straight line including the radius of the optical record medium at positions corresponding to directions same to each other of the signal track with respect to the boundary line, $$SE=\{(S1+S5)\pm(S2+S6)\}\times K\pm(S3\pm S4) \quad (1)$$

wherein K is a predetermined constant set in advance, and signs of the ±s are same to each other for each calculation.

The first tracking error signal generation device is further provided with: a selecting device for selecting one of the first tracking error signal and the second tracking error signal SE on the basis of an instruction from the external, and outputting the selected signal as an output tracking error signal.

According to the above described first tracking error signal generation device of the present invention, the first, second, fifth and sixth light detection signals S1, S2, S5 and S6 are inputted to the first operation device. Then, the first operation device adds the first and second light detection signals S1 and S2, adds the fifth and sixth light detection signals S5 and S6, and subtracts one of the first and second addition signals from the other to output the first tracking error signal according to the three beams method. On the other hand, the first to sixth light detection signals S1 to S6 are inputted to the second operation device. Then, the second operation device calculates the second tracking error signal SE according to the DPP method expressed by the expression (1), in case that the light receiving surfaces are arranged in a certain manner with respect to the disk shaped optical record medium and the boundary line. Finally, the selecting device selects one of the first tracking error signal and the second tracking error signal SE on the basis of an instruction from the external, and the selected signal is outputted as the output tracking error signal.

Thus, since the first tracking error signal is the tracking error signal according to the three beams method while the second tracking error signal is the tracking error signal according to the DPP method, one portion of the present tracking error signal generation device as well as one portion of the light detection elements in the optical pickup device can be commonly used as a tracking error signal generation circuit by means of the three beams method and a tracking error signal generation circuit by means of the DPP method. Consequently, the construction of the optical pickup device for reproducing and/or recording the optical record medium of one type among various types whose track pitches are different from each other such as the CD, the DVD, etc., can be simplified, and the adjustment of the optical system and signal processing for various types of the optical record media can be also simplified according to the present invention.

In one aspect of the first tracking error signal generation device, the optical record media include a first optical record medium of one type having a first track pitch and a second optical record medium of another type having a second track pitch which is substantially half of the first track pitch. A shift amount of the first and second sub beam spots with respect to the main beam spot in a radial direction of each of the first and second optical record media is set to substantially ¼ of the first track pitch. The selecting device selects the first tracking error signal for the first optical record medium and selects the second tracking error signal SE for the second optical record medium on the basis of the instruction from the external.

According to this aspect of the present invention, the light beam irradiation positions of the main beam and the first and second sub beams to obtain the optimum sensitivity in case of generating the tracking error signal by means of the three beams method with respect to the first optical record medium is coincident with that to obtain the optimum sensitivity in case of generating the tracking error signal by means of the DPP method with respect to the second optical record medium. Thus, by use of the same light beam irradiation positions i.e. without changing the optimum beam arrangement, an excellent optimum tracking error signal having the optimum sensitivity can be obtained with respect to both cases of the first and second optical record media.

In another aspect of the first tracking error signal generation device, the second operation device has a first switch for switching the expression (1) from one of SE:={(S1+S5)+(S2+S6)}×K+(S3+S4) and SE={(S1+S5)−(S2+S6)}×K−(S3−S4) to the other to calculate the second tracking error signal SE. The selecting device has a second switch for switching an output of the selecting device to one of the first operation device and the second operation device, and the first tracking error signal generation device is further provided with a controller for generating a switch control signal on the basis of the instruction from the external, and controlling the first and second switches by the switch control signal.

According to this aspect of the present invention, the controller generates a switch control signal on the basis of the instruction from the external, and the first and second switches are controlled by the switch control signal. Thus, the switching operation with respect to the optical record media of various types can be reliably and speedily performed according to this aspect.

In another aspect of the present invention, the predetermined constant K used in the expression (1) is equal to 1. Thus, the construction of the second operation device can be simplified. The predetermined constant K may be not equal to 1 depending on the difference in the light intensity of the main beam and the first or second sub beam, the difference in the light sensitivity of the light detection device, etc., so as to compensate the influence of the difference onto the second tracking error signal SE.

The above object of the present invention can be achieved by a second tracking error signal generation device used for an optical pickup device capable of reproducing and/or recording an information signal on a spiral or coaxial signal track of a disk shaped optical record medium of one type among a plurality of optical record media of different types which track pitches are different from each other.

The optical pickup device is provided with: a light beam irradiation device for irradiating the optical record medium with a main beam for forming a main beam spot on the signal track, a first sub beam for forming a first sub beam spot on the optical record medium ahead of the main beam spot and a second sub beam for forming a second sub beam spot behind the main beam spot; a first light detection device having a light receiving surface D1 for receiving a reflection light of the first sub beam and outputting a first light detection signal S1 indicating a light amount received by the light receiving surface D1; a second light detection device having at least four light receiving surfaces D2 to D5 which are divided by a first boundary line substantially parallel to a tangent direction of the signal track and by a second boundary line substantially orthogonal to the tangent direction for receiving a reflection light of the main beam and outputting second to fifth light detection signals S2 to S5 indicating light amounts received by the four light receiving surfaces D2 to D5 respectively; and a third light detection device having a light receiving surface D6 for receiving a reflection light of the second sub beam and outputting a sixth light detection signal S6 indicating a light amount received by the light receiving surface D6.

The second tracking error signal generation device is provided with: a first operation device, to which the first and sixth light detection signals S1 and S6 are inputted, for subtracting one of the first and sixth light detection signals S1 and S6 from the other to output its result as a first tracking error signal according to a three beams method; and a second operation device, to which the second to fifth light detection signals S2 to S5 are inputted, for calculating a second tracking error signal according to a heterodyne method based on an addition signal SADD expressed by an expression (2) and a difference signal SDEF expressed by an expression (3), in case that the light receiving surfaces D2, D3, D4 and D5 are respectively disposed in second, first, third and fourth quadrants with respect to the first and second boundary lines assuming that a direction of the first boundary line corresponding to an information reading direction of the optical record medium is positive and a direction of the second boundary line corresponding to a direction from an inner circumference to an outer circumference of the optical record medium is positive to define the first to fourth quadrants,

SADD=S2+S3+S4+S5 (2)

SDEF=(S2+S5)−(S3+S4) (3)

The second tracking error signal generation device is further provided with: a selecting device for selecting one of the first and second tracking error signals on the basis of an instruction from the external, and outputting the selected signal as an output tracking error signal.

According to the above described second tracking error signal generation device of the present invention, the first and sixth light detection signals S1 and S6 are inputted to the first operation device. Then, the first operation device subtracts one of the first and sixth light detection signals S1 and S6 from the other to output its result as the first tracking error signal according to the three beams method. On the other hand, the second to fifth light detection signals S2 to S5 are inputted to the second operation device. Then, the second operation device calculates the second tracking error signal according to the heterodyne method based on the addition signal SADD expressed by the expression (2) and the difference signal SDEF expressed by an expression (3), in case that the light receiving surfaces are arranged in a certain manner with respect to the first to fourth quadrants based on the boundary lines. Finally, the selecting device selects one of the first and second tracking error signals on the basis of the instruction from the external, and the selected signal is outputted as the output tracking error signal.

Thus, since the first tracking error signal is the tracking error signal according to the three beams method while the second tracking error signal is the tracking error signal according to the heterodyne method, one portion of the present tracking error signal generation device as well as one portion of the light detection elements in the optical pickup device can be commonly used as a tracking error signal generation circuit by means of the three beams method and a tracking error signal generation circuit by means of the heterodyne method. Consequently, the construction of the optical pickup device for reproducing and/or recording the optical record medium of one type among various types whose track pitches are different from each other such as the CD, the DVD, etc., can be simplified, and the adjustment of the optical system and signal processing for various types of the optical record media can be also simplified according to the present invention.

In one aspect of the second tracking error signal generation device, the selecting device has a switch for switching an output of the selecting device to one of the first operation device and the second operation device, and the second tracking error signal generation device is further provided with a controller for generating a switch control signal on the basis of the instruction from the external, and controlling the switch by the switch control signal.

According to this aspect of the present invention, the controller generates a switch control signal on the basis of the instruction from the external, and the switch is controlled by the switch control signal. Thus, the switching operation with respect to the optical record media of various types can be reliably and speedily performed according to this aspect.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a flow chart of one operation of the first embodiment;

DETAILED DESCRIPTION OF THE PREFERRED EMBODIMENTS

Referring to the accompanying drawings, embodiments of the present invention will be now explained.

First Embodiment

Figure 1:
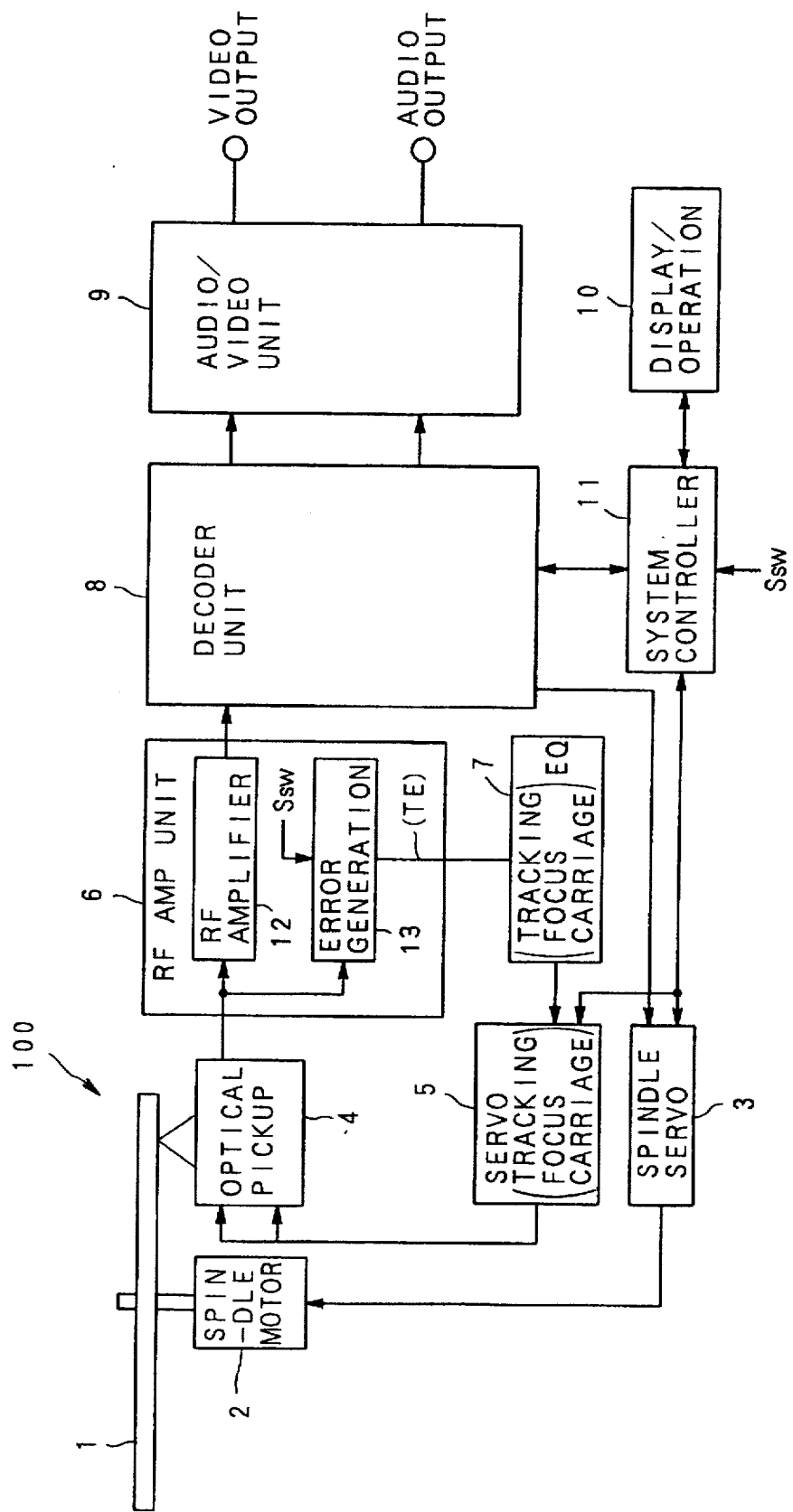
FIG. 1 is a block diagram of a compatible optical disk player as a first embodiment of the present invention.

FIG. 1 shows a block diagram of a compatible optical disk player capable of reproducing a CD (Compact Disk) and a DVD (Digital Video Disk) as optical disks.

A compatible optical disk player 100 is provided with: a spindle motor 2 for rotationally driving an optical disk 1; a spindle serva circuit 3 for performing the spindle servo operation of the spindl 2; an optical pickup 4 for irradiating the optical disk 1 with a reproduction light beam, receiving the reflected light from the optical disk 1, and outputting a light detection signal (RF signal); and a servo circuit 5 for performing a tracking servo control, a focus servo control and a carriage servo control on the basis of servo control signals. The compatible optical disk player 100 is also provided with: an RF (Radio Frequency) amplifier unit 6 for amplifying the light detection signal of the optical pickup 4, and generating and outputting various error signals; an equalizer unit 7 for outputting the servo control signals for performing the tracking servo control, the focus servo control and the carriage servo control on the basis of the error signals outputted from the RF amplifier unit 6; a decoder unit 8 for decoding the amplified light detection signal outputted by the RF amplifier unit 6 and outputting the decoded video data and the decoded audio data; and an audio/video unit 9 for generating a video output signal and an audio output signal on the basis of the decoded video data and the decoded audio data. The compatible optical disk player 100 is further provided with: a display and operation unit 10 for displaying various data and performing various input operations; and a system controller 11 for performing the over all control of the compatible optical disk player 100.

The RF amplifier unit 6 is provided with: an RF amplifier 12 for amplifying the light detection signal and outputting it as the amplified light detection signal; and an error signal generation circuit 13 for generating and outputting the error signals (e.g. the tracking error signal, the focus error signal, the carriage error signal) on the basis of the light detection signal.

Figure 2:
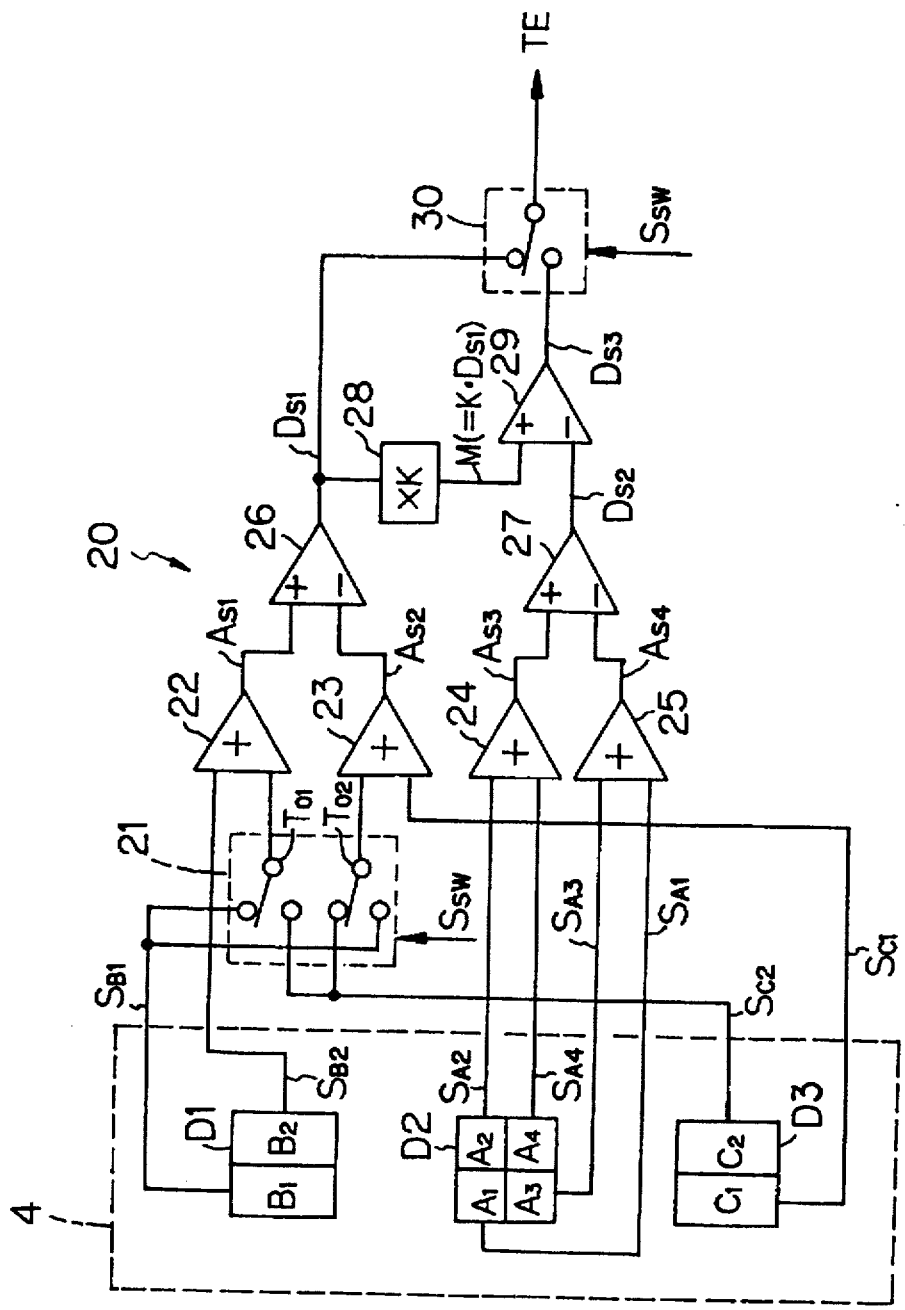
FIG. 2 is a circuit diagram of a tracking error signal generation circuit of the first embodiment.

FIG. 2 shows a circuit diagram of a tracking error signal generation circuit 20, which is included in the error generation circuit 13 of FIG. 1, and a main portion of the optical pickup 4, which is disposed at the tracking error signal generation circuit 20.

In FIG. 2, the optical pickup 4 is provided with: a first light detection element D1 having a first light receiving surface B1 and a second light receiving surface B2 which receive the reflection light of the first sub beam from the optical disk 1; a second light detection element D2 having first to fourth light receiving surfaces A1 to A4 which receive the reflection light of the main beam from the optical disk 1; and a third light detection element D3 having a first light receiving surface C1 and a second light receiving surface C2 which receive the reflection light of the second sub beam from the optical disk 1.

The tracking error signal generation circuit 20 is provided with: a first switch 21, to which an output signal $S_{B1}$ of the first light receiving surface B1 of the first light detection element D1 and an output signal $S_{C2}$ of the second light receiving surface C2 of the third light detection element D3, outputting the output signal $S_{B1}$ from either one of a first output terminal $T_{O1}$ and a second output terminals $T_{O2}$ and outputting the output signal $S_{C2}$ from the other of the output terminals $T_{O1}$ and $T_{O2}$ on the basis of a switch control signal $S_{SW}$; a first adder 22, to which the output signal $S_{B2}$ of the second light receiving surface B2 of the first light detection element D1 is inputted at one of the input terminals and to which the output signal of the first output terminal $T_{O1}$ is inputted at the other of the input terminals, for adding the input signals of both input terminals to output it as a first addition signal $A_{S1}$; a second adder 23, to which the output signal $S_{C1}$ of the first light receiving surface C1 of the third light detection element D3 is inputted at one of the input terminals and to which the output signal of the second output terminal $T_{O2}$ is inputted at the other of the input terminals, for adding the input signals of both input terminals to output it as a second addition signal $A_{S2}$; a third adder 24, to which the output signal $S_{A2}$ of the second light receiving surface A2 of the second light detection element D2 is inputted at one of the input terminals and to which the output signal $S_{A4}$ of the fourth light receiving surface A4 of the second light detection element D2 is inputted at the other of the input terminals, for adding the input signals of both input terminals to output it as a third addition signal $A_{S3}$; and a fourth adder 25, to which the output signal $S_{A1}$ of the first light receiving surface A1 of the second light detection element D2 is inputted at one of the input terminals and to which the output signal $S_{A3}$ of the third light receiving surface A3 of the second light detection element D2 is inputted at the other of the input terminals, for adding the input signals of both input terminals to output it as a fourth addition signal $A_{S4}$. The tracking error signal generation circuit 20 is also provided with: a first subtracter 26, to which the first addition signal $A_{S1}$ is inputted at a non-inverted input terminal and to which the second addition signal $A_{S2}$ is inputted at an inverted input terminal, for subtracting the input signals to output the difference between the first addition signal $A_{S1}$ and the second addition signal $A_{S2}$ as a first difference signal $D_{S1}$; and a second subtracter 27, to which the third addition signal $A_{S3}$ is inputted at a non-inverted input terminal and to which the fourth addition signal $A_{S4}$ is inputted at an inverted input terminal, for subtracting the input signals to output the difference between the third addition signal $A_{S3}$ and the fourth addition signal $A_{S4}$ as a second difference signal $D_{S2}$. The tracking error signal generation circuit 20 is further provided with: a multiplier 28 for multiplying the first difference signal $D_{S1}$ with a predetermined constant K to output it as a multiply signal M ($=K \times D_{S1}$); a third subtracter 29, to which the multiply signal M is inputted at a non-inverted input terminal and to which the second difference signal $D_{S2}$ is inputted at an inverted input terminal, for subtracting the input signals to output the difference between the multiply signal M and the second difference signal $D_{S2}$ as a third difference signal $D_{S3}$; and a second switch 30 for outputting one of the first difference signal $D_{S1}$ and the third difference signal $D_{S3}$ as a tracking error signal TE on the basis of the switch control signal $S_{SW}$. The predetermined constant K to compensate the light intensity difference between the main beam and the first or second sub beams, the light sensitivity difference between the second light detection element D2 and the first or third light detection element D1 or D3, and so on, is set in advance to the multiplier 28.

In FIG. 2, the upper side of each of the first and second switches 21 and 30 is the 3 beam side (i.e. the side for performing the tracking error signal generation by means of the 3 beams method), while the lower side of each of the first and second switches 21 and 30 is the DPP side (i.e. the side for performing the tracking error signal generation by means of the DPP method).

First Example of Operation

Nextly, the operation for identifying the type of the optical disk 1 and changing the tracking error signal in accordance with the identified type of the first embodiment will be explained with referring to a flow chart of FIG. 3 and diagrams of FIGS. 4A, 4B, 5A and 5B.

In this case, it is assumed that the 3 beams method is employed as the method of generating the tracking error signal at the time of reproducing the CD as the optical disk 1, and the DPP (Differential Push Pull) method is employed as the method of generating the tracking error signal at the time of reproducing the DVD, and that the wave length of each light beam and each beam spot diameter suitable for the DVD reproduction are employed.

Figure 4A:
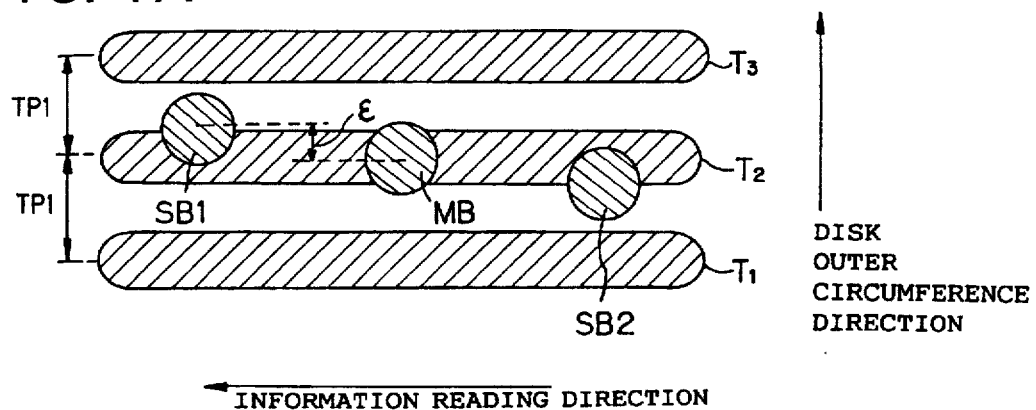
FIG. 4 which consist of FIGS. 4A and 4B, are diagrams for explaining the operation of the first embodiment.
Figure 4B:
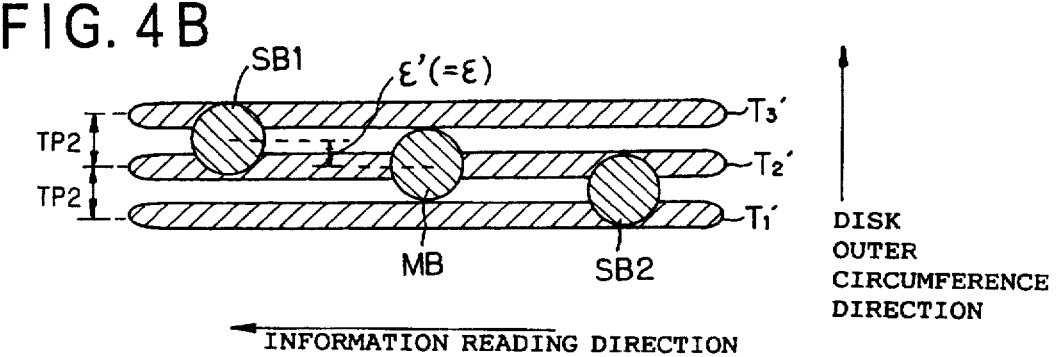

The relationship between the signal tracks T1 to T3 and each of a beam spot MB formed by the main beam, a beam spot SB1 formed by the first sub beam and a beam spot SB2 formed by the second sub beam at the time of reproducing the CD (when the beam spots are on the track) are as shown in FIG. 4A. The relationship between the signal tracks T1' to T3' and each of the beam spots MB, SB1 and SB2 at the time of reproducing the DVD (when the center of the beam spot MB is on the track) are as shown in FIG. 4B.

In FIG. 3, at first, the system controller 11 controls the servo circuit 5 to turn on the focus servo (i.e. change the condition of the focus servo to the closed condition) (step S1).

Further, the system controller 11 starts the rotation driving of the spindle motor 2 via the spindle servo unit 3 (step S2).

Then, the system controller 11 switches the first switch 21 and the second switch 30 by the switch control signal $S_{SW}$ to the 3 beam side (as shown in FIG. 2) (step S3).

Figure 5A:
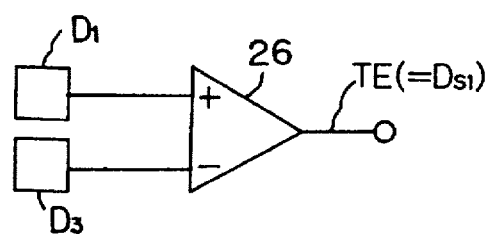
FIG. 5 which consist of FIGS. 5a and 5B, are circuit diagrams of equivalent circuits of the first embodiment at two different operations respectively.

By this, the tracking error signal generation circuit 20 becomes substantially equivalent to a tracking error signal generation circuit by means of the 3 beams method shown in FIG. 5A.

In FIG. 5A, the equivalent circuit generates the first difference signal $D_{S1}$ out of the light detection signals from the light detection elements D1 and D2, and outputs it as the tracking error signal TE by means of the 3 beam method.

More concretely, the equivalent circuit in FIG. 5A subtracts one of a first addition signal $(S_{B1}+S_{B2})$ of the light detection element D1 and a second addition signal $(S_{C1}+S_{C2})$ of the light detection element D3 from the other, to output its result as the first tracking error signal TE $(=D_{S1})$ according to the three beams method.

Nextly, the system controller 11 detects the level of the tracking error signal TE $(=D_{S1})$ outputted from the tracking error signal generation circuit 20 (step S4), and compares it with a predetermined level set in advance (step S5).

At this time, if the optical disk 1 to be reproduced is the CD, since three beam spots MB, SB1 and SB2 are formed in a condition shown in FIG. 4A, the compared level is supposed to be higher than the predetermined level in case of generating the tracking error signal TE $(=D_{S1})$ by means of the 3 beams method.

On the contrary, if the optical disk 1 to be reproduced is the DVD, since three beam spots MB, SB1 and SB2 are formed in a condition shown in FIG. 4B, the compared level is supposed to be not higher (lower) than the predetermined level in case of generating the tracking error signal TE $(=D_{S1})$ by means of the 3 beams method.

Therefore, according to the comparison at the step S5, if the level of the tracking error signal TE $(=D_{S1})$ is higher than the predetermined level, it is judged that the optical disk 1 to be reproduced is the CD, and the operation for harmonizing the tracking error signal to the type of the optical disk 1 is completed in the condition as it is so as to continue the generation of the tracking error signal by means of the 3 beams method.

On the other hand, according to the comparison at the step S5, if the level of the tracking error signal TE $(=D_{S1})$ is not higher (lower) than the predetermined level, it is judged that the optical disk 1 to be reproduced is the DVD, and the system controller 11 switches the first switch 21 and the second switch 30 to the DPP side so as to perform the generation of the tracking error signal TE $(=D_{S3})$ by means of the DPP method (step S6).

Figure 5B:
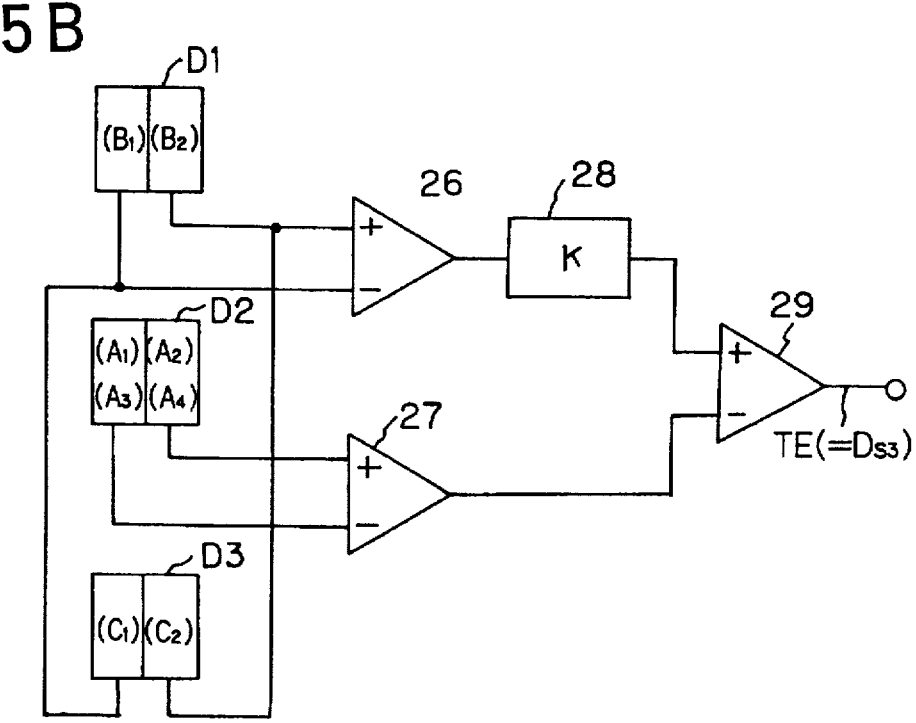

By this, the tracking error signal generation circuit 20 becomes substantially equivalent to the tracking error signal generation circuit by means of the DPP method shown in FIG. 5B, so that the operation for harmonizing the tracking error signal to the type of the optical disk 1 is completed in the condition that the reproduction of the DVD is possible.

In FIG. 5B, the equivalent circuit generates the first difference signal $D_{S3}$ out of the light detection signals from the light detection elements D1, D2 and D3, and outputs it as the tracking error signal TE by means of the 3 beam method.

More concretely, the light detection signals are inputted to the equivalent circuit in FIG. 5B. Then, the second tracking error signal SE according to the DPP method expressed by the expression (1)', in case that the light receiving surfaces B1 and C1 respectively corresponding to the first and fifth light detection signals $S_{B1}$ and $S_{C1}$ are arranged on one straight line including the radius of the optical disk 1 at positions corresponding to directions same to each other of the signal track with respect to the boundary line, and that the light receiving surfaces B2 and C2 respectively corresponding to the second and sixth light detection signals $S_{B2}$ and $S_{C2}$ are arranged on another straight line including the radius of the optical disk 1 at positions corresponding to directions same to each other of the signal track with respect to the boundary line, $$SE = \{(S_{B1}+S_{C1}) \pm (S_{B2}+S_{C2})\} \times K \pm (A_{S3} \pm A_{S4}) \quad (1)'$$

wherein signs (plus and minus) of the ±s are same to each other for each calculation depending on the position of the first switch 21 of FIG. 2. For example, one of the second tracking error signal expressed by $SE=\{(S_{B1}+S_{C1})+(S_{B2}+S_{C2})\} \times K+(A_{S3}+A_{S4})$ and the second tracking error signal expressed by $SE=\{(S_{B1}+S_{C1})-(S_{B2}+S_{C2})\} \times K-(A_{S3}-A_{S4})$ is outputted from the equivalent circuit of FIG. 5B.

Second Example of Operation

Another example of the operation for identifying the type of the optical disk 1 and changing the tracking error signal in accordance with the identified type of the present embodiment will be explained with referring to FIG. 6.

Figure 6:
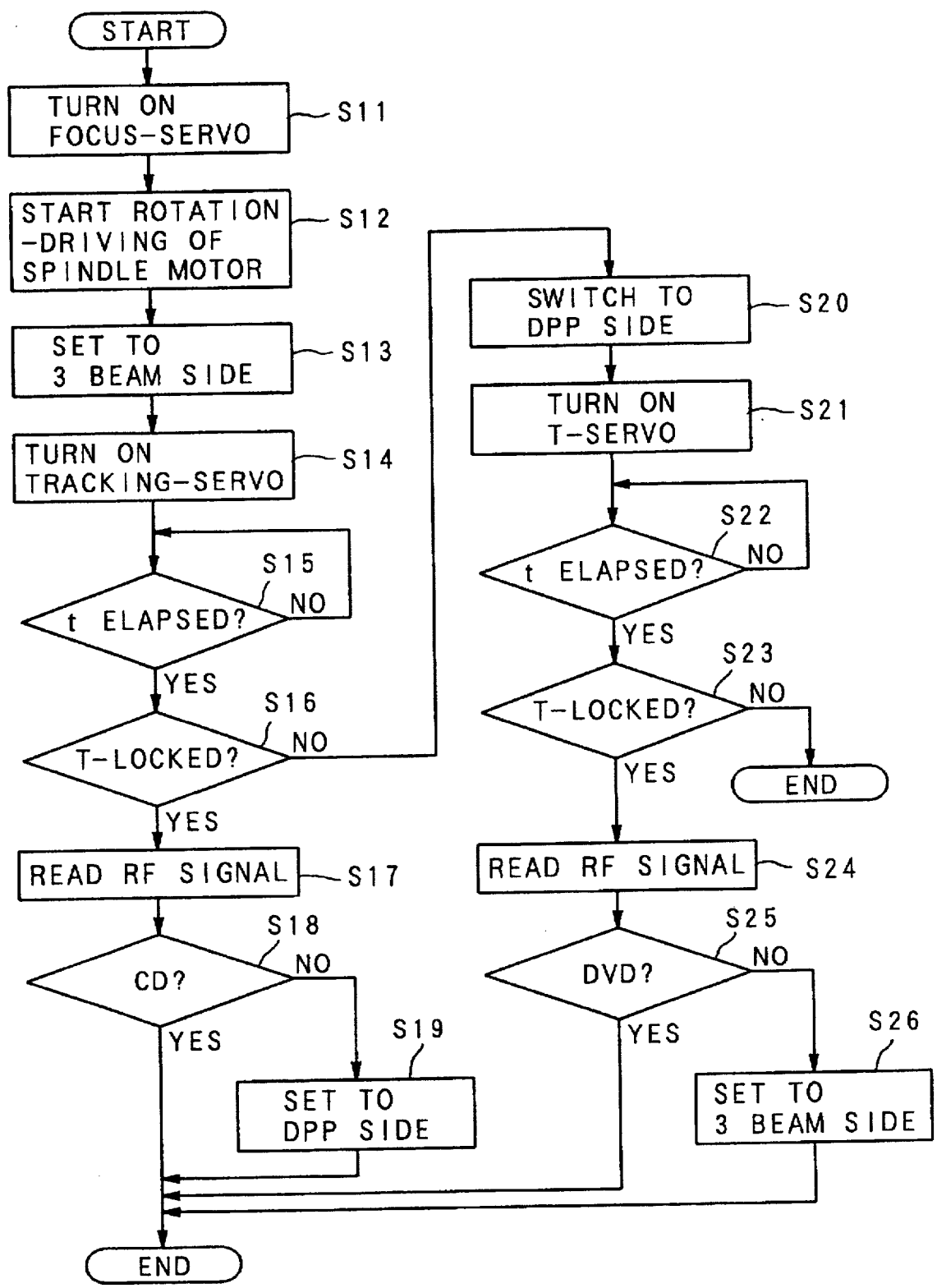
FIG. 6 is a flow chart of another operation of the first embodiment.

In FIG. 6, at first, the system controller 11 controls the servo circuit 5 to turn on the focus servo (i.e. change the condition of the focus servo to the closed condition) (step S11).

Further, the system controller 11 starts the rotation driving of the spindle motor 2 via the spindle servo unit 3 (step S12).

Then, the system controller 11 switches the first switch 21 and the second switch 30 by the switch control signal $S_{SW}$ to the 3 beam side (as shown in FIG. 2) (step S13).

By this, the tracking error signal generation circuit 20 becomes substantially equivalent to the tracking error signal generation circuit by means of the 3 beams method of FIG. 5A.

Nextly, the system controller 11 controls the servo circuit 5 to turn on the tracking servo (i.e. change the condition of the tracking servo to the closed condition) (step S14).

Then, it is judged whether or not a predetermined time t has elapsed from the time of turning on the tracking servo (step S15). If it the predetermined time t has elapsed (step S15: YES), it is further judged whether or not the PLL (Phase Locked Loop) which forms the tracking servo loop is locked (step S16).

At the step S16, if the PLL is judged to be locked (YES), it is estimated that the optical disk 1 to be reproduced is the CD. In order to confirm this estimation, the obtained light detection signal (RF signal) is read and decoded by the decoder unit 8 (step S17), and by reading the TOC (Table Of Contents) information for example, it is judged whether or not the optical disk 1 to be reproduced is the CD (step S18).

At the step S18, if the optical disk 1 to be reproduced is the CD (YES), the operation for harmonizing the tracking error signal to the type of the optical disk 1 is completed in the condition as it is so as to continue the generation of the tracking error signal TE (=$D_{S1}$) by means of the 3 beam method.

At the step S18, if the optical disk 1 to be reproduced is not judged to be the CD (NO), it is judged that the optical disk 1 to be reproduced is the DVD. Thus, in order to perform the generation of the tracking error signal TE (=$D_{S3}$) by means of the DPP method, the system controller 11 switches the first switch 21 and the second switch 30 to the DPP side by the switch signal $S_{SW}$ (Step S19).

By this, the tracking error signal generation circuit 20 becomes substantially equivalent to the tracking error signal generation circuit by means of the DPP method shown in FIG. 5B, so that the operation for harmonizing the tracking error signal to the type of the optical disk 1 is completed in the condition that the reproduction of the DVD is possible.

At the step S16, if the PLL is not judged to be locked (NO), it is estimated that the optical disk 1 to be reproduced is the DVD. Thus, in order to perform the generation of the tracking error signal by means of the DPP method, the system controller 11 switches the first switch 21 and the second switch 30 to the DPP side by the switch control signal $S_{SW}$ (step S20).

Nextly, the system controller 11 controls the servo circuit 5 to turn on the tracking servo (i.e. change the condition of the tracking servo to the closed condition) (step S21).

Then, it is judged whether or not a predetermined time t has elapsed from the time of turning on the tracking servo (step S22). If the predetermined time t has elapsed (step S22: YES), it is further judged whether or not the PLL (Phase Locked Loop) which forms the tracking servo loop is locked (step S23).

At the step S23, if the PLL is judged to be locked (YES), it is estimated that the optical disk 1 to be reproduced is the DVD. In order to confirm this estimation, the obtained light detection signal (RF signal) are read and decoded by the decoder unit 8 (step S24), and by reading the TOC information for example, it is judged whether or not the optical disk 1 to be reproduced is recorded by the format of the DVD (step S25).

At the step S25, if the optical disk 1 to be reproduced is the DVD (YES), the operation for harmonizing the tracking error signal to the type of the optical disk 1 is completed in the condition as it is so as to continue the generation of the tracking error signal TE (=$D_{S3}$) by means of the DPP method.

At the step S25, if the optical disk 1 to be reproduced is not judged to be the DVD (NO), it is judged that the optical disk 1 to be reproduced is the CD. Thus, in order to perform the generation of the tracking error signal TE (=$D_{S1}$) by means of the 3 beams method, the system controller 11 switches the first switch 21 and the second switch 30 to the 3 beam side by the switch control signal $S_{SW}$ (step S26).

By this, the tracking error signal generation circuit 20 becomes substantially equivalent to the tracking error signal generation circuit by means of the 3 beams method shown in FIG. 5A, so that the operation for harmonizing the tracking error signal to the type of the optical disk 1 is completed in the condition that the reproduction of the CD is possible.

As described above in detail, one portion of the tracking signal error signal generation circuit by means of the 3 beams method and one portion of the tracking error signal generation circuit by means of the DPP method are shared to each other, and one portion of the light detection element constituting the optical pickup is commonly used to those circuits. Therefore, the construction of the optical pickup for reproducing the optical record medium of one type among various types whose track pitches are different from each other such as the CD and the DVD can be simplified, and the adjustment of the optical system and signal processing for various types of the optical disk 1 can be also simplified according to the present embodiment.

At this time, assuming that the track pitch TP1 of the CD is about double of the track pitch TP2 of the DVD (i.e. TP1=TP2×2), it is preferable to set a shift amount $\epsilon$ of the beam spot SB1 of the first sub beam or the beam spot SB2 of the second sub beam with respect to the beam spot MB of the main beam in the direction of the disk radial direction (disk outer circumference direction) as shown in FIG. 4A, as: $\epsilon$=TP1/4, which corresponds to the highest sensitivity with respect to the track pitch TP1 of the CD in the 3 beams method. This value of $\epsilon$ is equivalent to a shift amount $\epsilon'$ (=TP2/2) which corresponds to the highest sensitivity with respect to the track pitch TP2 of the DVD in the DPP method. Thus, the beam arrangement by setting the shift amount $\epsilon$ in this manner is quite advantageous in a practical sense.

The tracking error signal generation apparatus of the present embodiment is adapted to the reproducing apparatus (i.e. the player) in the above explanation, but it can be adapted in the same manner to the recording apparatus.

Second Embodiment

A tracking error signal generation apparatus as a second embodiment of the present invention will be explained with referring to FIGS. 7 and 8.

The tracking error signal generation circuit of the second embodiment is different from that of the first embodiment in that the 3 beams method and the heterodyne method are employed in the tracking error signal generation circuit in place of the 3 beams method and the DPP method of the first embodiment.

Figure 7:
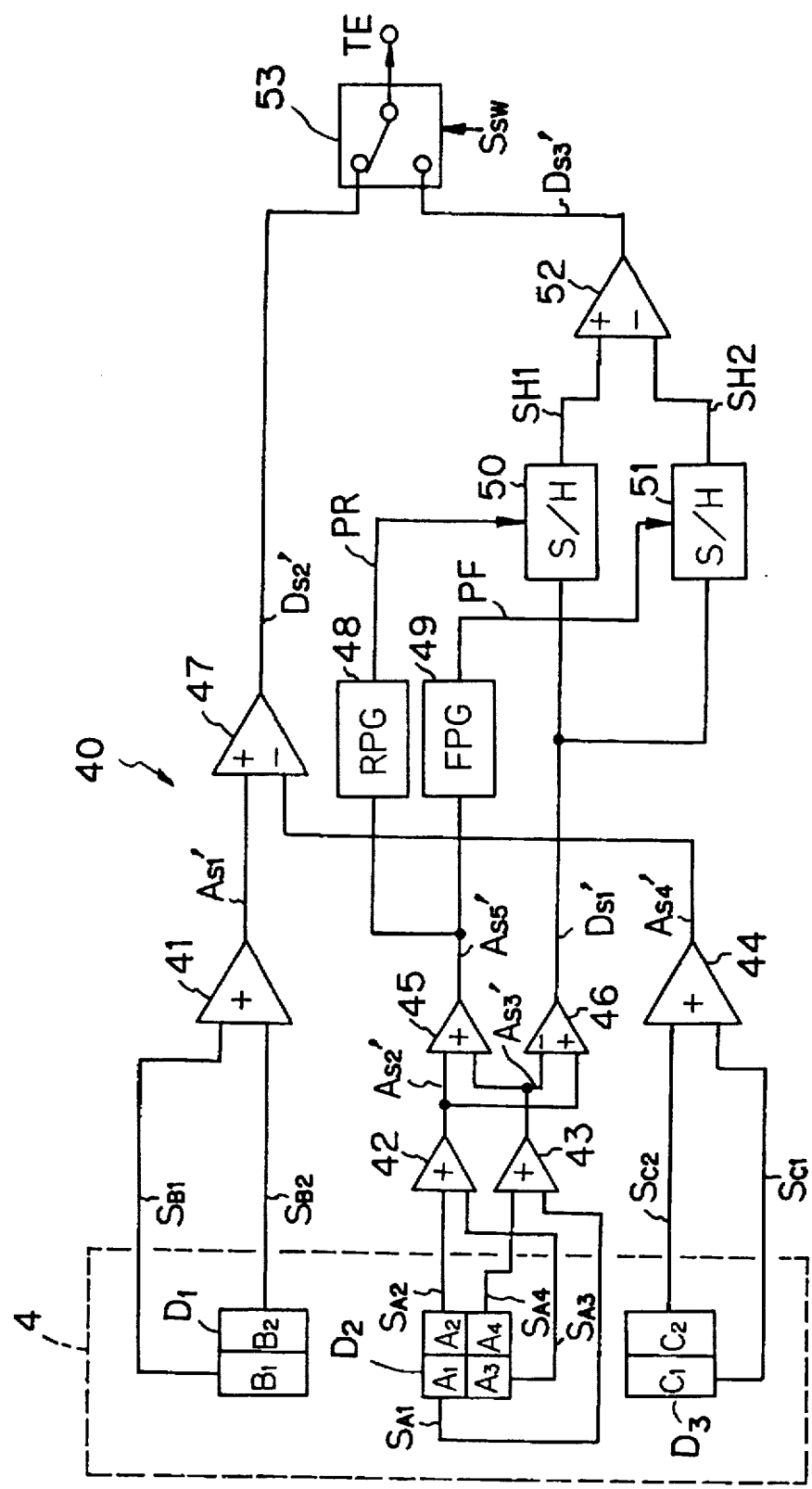
FIG. 7 is a circuit diagram of a tracking error signal generation circuit of a second embodiment.

In FIG. 7, the tracking error signal generation circuit 40 is provided with: a first adder 41, to which the output signal $S_{B1}$ of the first light receiving surface B1 and the output signal $S_{B2}$ of the second light receiving surface B2 of the first light detection element D1 are inputted, for adding these input signals to outputting it as a first addition signal $A_{S1}'$; a second adder 42, to which the output signal $S_{A2}$ of the second light receiving surface A2 and the output signal $S_{A3}$ of the third light receiving surface A3 of the second light detection element D2 are inputted, for adding these input signals to outputting it as a second addition signal $A_{S2}'$; a third adder 43, to which the output signal $S_{A1}$ of the first light receiving surface A1 and the output signal $S_{A4}$ of the fourth light receiving surface A4 of the second light detection element D2 are inputted, for adding these input signals to outputting it as a third addition signal $A_{S3}'$; a fourth adder 44, to which the output signal $S_{C1}$ of the first light receiving surface C1 and the output signal $S_{C2}$ of the second light receiving surface C2 of the third light detection element D3 are inputted, for adding these input signals to outputting it as a fourth addition signal $A_{S4}'$; and a fifth adder 45, to which the second addition signal $A_{S2}'$ and the third addition signal $A_{S3}'$ are inputted, for adding these input signals to outputting it as a fifth addition signal $A_{SS}'$. The tracking error signal generation circuit 40 is also provided with: a first subtracter 46, to which the third addition signal $A_{S3}'$ is inputted at an inverted input terminal and to which the second addition signal $A_{S2}'$ is inputted at a non-inverted input terminal, for subtracting the input signals to output the difference between the second addition signal $A_{S2}'$ and the third addition signal $A_{S3}'$ as a first difference signal $D_{S1}'$; and a second subtracter 47, to which the first addition signal $A_{S1}'$ is inputted at a non-inverted input terminal and to which the fourth addition signal $A_{S4}'$ is inputted at an inverted input terminal, for subtracting the input signals to output the difference between the first addition signal $A_{S1}$40 and the fourth addition signal $A_{S4}'$ as a second difference signal $D_{S2}'$. The tracking error signal generation circuit 40 is also provided with: a rising pulse generation circuit (RPG) 48 for detecting the signal-rise-up of the fifth addition signal $A_{SS}'$ and generating a rising pulse signal PR corresponding to the rising-up timing; a falling pulse generation circuit (FPG) 49 for detecting the signal-fall-down of the fifth addition signal $A_{SS}'$ and generating a falling pulse signal PF corresponding to the falling-down timing; a first sample hold circuit (S/H) 50 for sampling and holding the first difference signal $D_{S1}'$ by use of the rising pulse PR as the sampling timing signal, to output it as a first sample hold signal SH1; and a second sample hold circuit (S/H) 51 for sampling and holding the first difference signal $D_{S1}'$ by use of the falling pulse PF as the sampling timing signal, to output it as a second sample hold signal SH2. The tracking error signal generation circuit 40 is also provided with: a third subtracter 52, to which the first sample hold signal SH1 is inputted at a non-inverted input terminal and to which the second sample hold signal SH2 is inputted at an inverted input terminal, for subtracting the input signals to output the difference between the first sample hold signal SH1 and the second sample hold signal SH2 as a third difference signal $D_{S3}'$; and a switch 53, to which the second difference signal $D_{S2}'$ and the third difference signal $D_{S3}'$ are inputted, for outputting one of the difference signals as the tracking error signal TE on the basis of a switch control signal $S_{SW}$.

In FIG. 7, the upper side of the switch 53 is the 3 beam side (i.e. the side for performing the tracking error signal generation by means of the 3 beams method), while the lower side of the switch 53 is the heterodyne side (i.e. the side for performing the tracking error signal generation by means of the heterodyne method).

Nextly, the operation for identifying the type of the optical disk 1 and changing the tracking error signal in accordance with the identified type of the second embodiment will be explained.

In this case, it is assumed that the 3 beams method is employed as the method of generating the tracking error signal at the time of reproducing the CD as the optical disk 1, and the heterodyne method is employed as the method of generating the tracking error signal at the time of reproducing the DVD, and that the wave length of each light beam and each beam spot diameter suitable for the DVD reproduction are employed.

The relationship between the signal tracks T1 to T3 and each of the beam spots MB, SB1 and SB2 at the time of reproducing the CD (when the beam spot M8 is on the track) are as shown in FIG. 4A. The relationship between the signal tracks T1' to T3' and each of the beam spots MB, SB1 and SB2 at the time of reproducing the DVD (when the beam spot MB is on the track) are as shown in FIG. 4B.

At first, the system controller 11 controls the servo circuit 5 to turn on the focus servo (i.e. change the condition of the focus servo to the closed condition).

Further, the system controller 11 starts the rotation driving of the spindle motor 2 via the spindle servo unit 3.

Then, the system controller 11 switches the switch 53 by the switch control signal $S_{SW}$ to the 3 beam side (as shown in FIG. 7).

By this, the tracking error signal generation circuit 40 becomes substantially equivalent to a tracking error signal generation circuit by means of the 3 beams method shown in FIG. 5A.

Nextly, the system controller 11 detects the level of the tracking error signal TE (=$D_{S2}'$) outputted from the tracking error signal generation circuit 40, and compares it with a predetermined level set in advance.

At this time, if the optical disk 1 to be reproduced is the CD, since three beam spots MB, SB1 and SB2 are formed in a condition shown in FIG. 4A, the compared level is supposed to be higher than the predetermined level in case of generating the tracking error signal by means of the 3 beams method.

On the contrary, if the optical disk 1 to be reproduced is the DVD, since three beam spots MB, SB1 and SB2 are formed in a condition shown in FIG. 4B, the compared level is supposed to be not higher than the predetermined level in case of generating the tracking error signal by means of the 3 beams method.

Therefore, according to this comparison, if the level of the tracking error signal TE (=$D_{S2}'$) is higher than the predetermined level, it is judged that the optical disk 1 to be reproduced is the CD, and the operation for harmonizing the tracking error signal to the type of the optical disk 1 is completed in the condition as it is so as to continue the generation of the tracking error signal by means of the 3 beams method.

On the other hand, according to the comparison with the predetermined level, if the level of the tracking error signal TE is not higher than the predetermined level, it is judged that the optical disk 1 to be reproduced is the DVD, and the system controller 11 switches the switch 53 to the heterodyne side (lower side in FIG. 7) so as to perform the generation of the tracking error by means of the heterodyne method.

Figure 8:
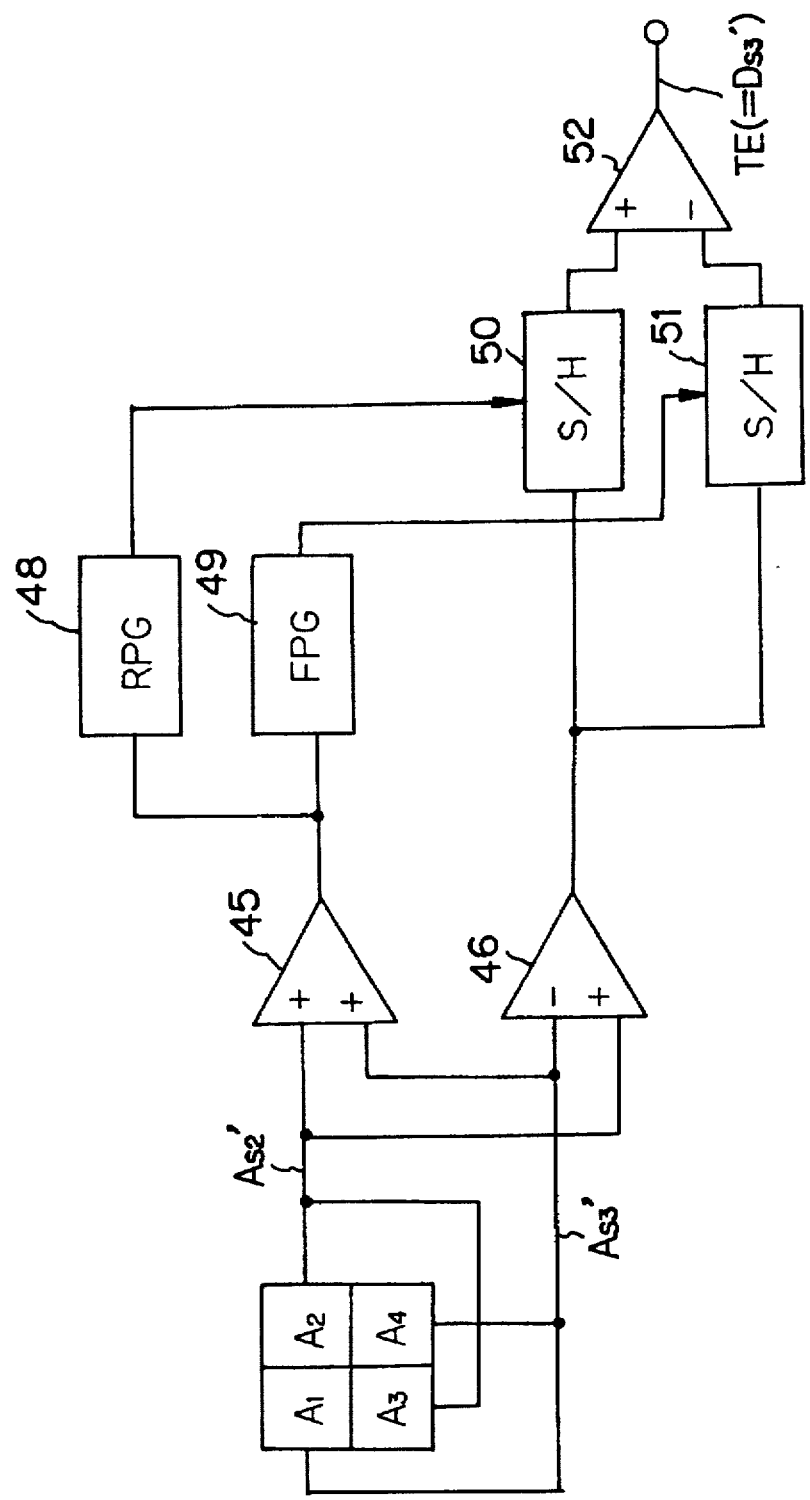
FIG. 8 is a circuit diagram of an equivalent circuit of the first embodiment at the time of one operation.

By this, the tracking error signal generation circuit 40 becomes substantially equivalent to the tracking error signal generation circuit by means of the heterodyne method shown in FIG. 8, so that the operation for harmonizing the tracking error signal to the type of the optical disk 1 is completed in the condition that the reproduction of the DVD is possible.

More concretely, the second to fifth light detection signals S2 to S5 are inputted to the equivalent circuit in FIG. 8. The equivalent circuit calculates the second tracking error signal TE (=$D_{e3}'$) according to the heterodyne method based on the addition signal SADD expressed by the expression (2)' and the difference signal SDEF expressed by the expression (3)', in case that the light receiving surfaces A1, A2, A3 and A4 are respectively disposed in second, first, third and fourth quadrants with respect to the first and second boundary lines assuming that the direction of the first boundary line corresponding to the information reading direction is positive and the direction of the second boundary line corresponding to the direction from the inner circumference to the outer circumference of the optical disk 1 is positive to define the first to fourth quadrants as shown in FIG. 8.

$$SADD = S_{A1} + S_{A2} + S_{A3} + S_{A4} \quad (2)'$$

$$SDEF = (S_{A2} + S_{A4}) - (S_{A1} + S_{A4}) \quad (3)'$$

As described above in detail, one portion of the light detection element constituting the optical pickup is commonly used by the tracking signal error signal generation circuit by means of the 3 beams method and the tracking error signal generation circuit by means of the heterodyne method. The construction of the optical pickup for reproducing the optical record medium of one type among various types whose track pitches are different from each other such as the CD and the DVD can be simplified, and the adjustment of the optical system and the signal processing for the type of the optical disk 1 can be also simplified according to the present embodiment.

The tracking error signal generation device of the present embodiment is adapted to the reproducing apparatus (i.e. the player) in the above explanation, but it can be adapted in the same manner to the recording apparatus.

Third Embodiment

In the second embodiment, the light detection element for the DPP method is used as the first light detection element D1 and as the third light detection element D3, so that each of the light detection elements D1 and D3 has 2-divided light receiving surfaces.

Figure 9:
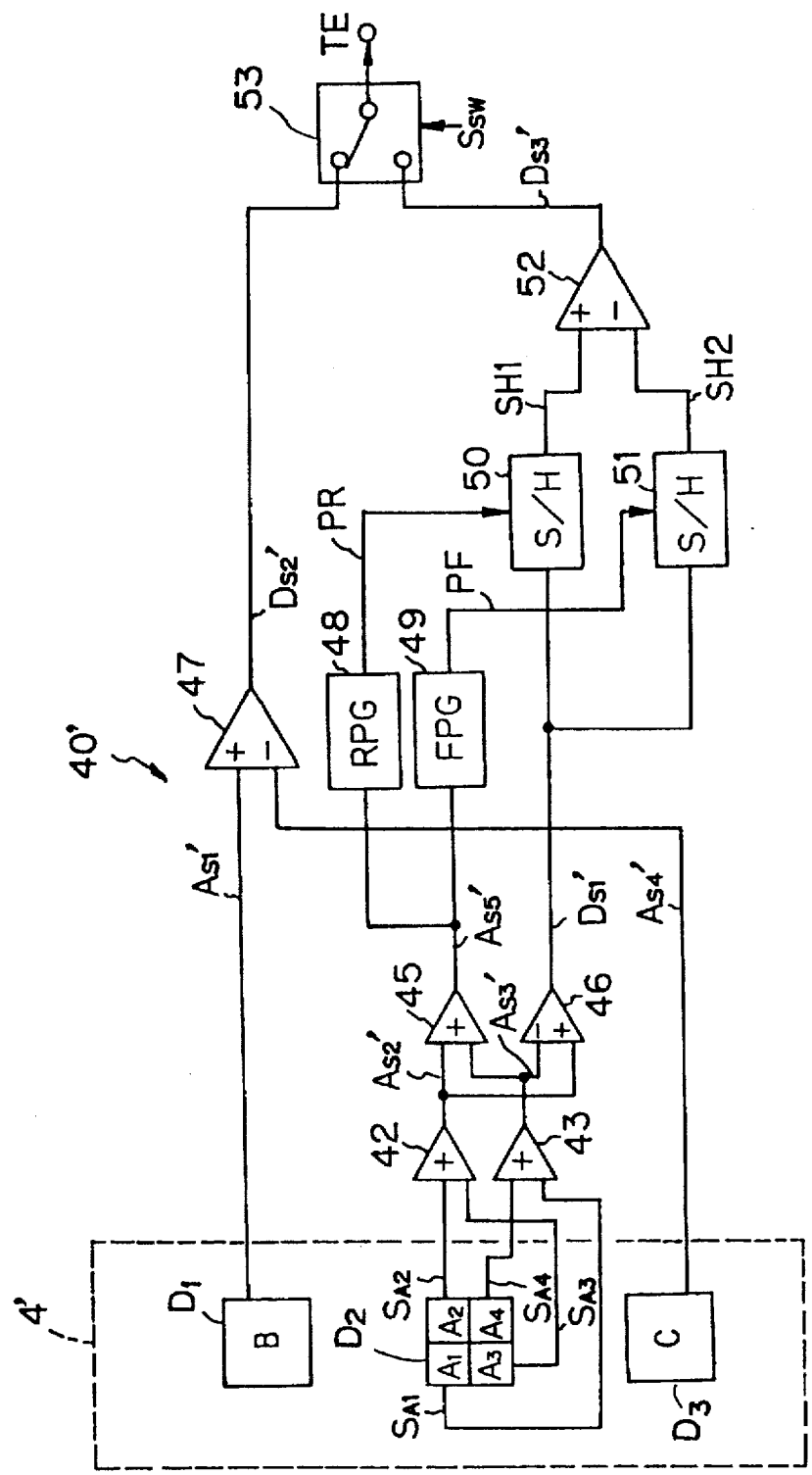
FIG. 9 is a circuit diagram of a tracking error signal generation circuit of a third embodiment.

As shown in FIG. 9, in a third embodiment, since each of the light detection elements D1 and D3 are used only for the 3 beams method, a light detection element having just one light receiving surface B is employed as the first light detection element D1, while a light detection element having just one light receiving surface C is employed as the third light detection element D3. The first adder 41 and the fourth adder 44 in FIG. 7 of the second embodiment are omitted in the construction of the third embodiment. Otherwise, the construction as well as the operation of the third embodiment is the same as those of the second embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A tracking error signal generation device used for an optical pickup device capable of reproducing and/or recording an information signal on a spiral or coaxial signal track of a disk shaped optical record medium of one type among a plurality of optical record media of different types which track pitches are different from each other, said optical pickup device comprising:

a light beam irradiation means for irradiating the optical record medium with a main beam for forming a main beam spot on the signal track, a first sub beam for forming a first sub beam spot on the optical record medium ahead of the main beam spot and a second sub beam for forming a second sub beam spot behind the main beam spot;

a first light detection means having at least two light receiving surfaces which are divided by a boundary line substantially parallel to a tangent direction of the signal track for receiving a reflection light of the first sub beam and outputting first and second light detection signals S1 and S2 indicating light amounts received by the two light receiving surfaces thereof respectively;

a second light detection means having at least two light receiving surfaces which are divided by a boundary line substantially parallel to the tangent direction for receiving a reflection light of the main beam and outputting third and fourth light detection signals S3 and S4 indicating light amounts received by the two light receiving surfaces thereof respectively; and a third light detection means having at least two light receiving surfaces which are divided by a boundary line substantially parallel to the tangent direction for receiving a reflection light of the second sub beam and outputting fifth and sixth light detection signals S5 and S6 indicating light amounts received by the two light receiving surfaces thereof respectively, said tracking error signal generation device comprising:

a first operation means, to which the first, second, fifth and sixth light detection signals S1, S2, S5 and S6 are inputted, for adding the first and second light detection signals S1 and S2 to output its result as a first addition signal, adding the fifth and sixth light detection signals S5 and S6 to output its result as a second addition signal, and subtracting one of the first and second addition signals from the other to output its result as a first tracking error signal according to a three beam method; and a second operation means, to which the first to sixth light detection signals S1 to S6 are inputted, for calculating a second tracking error signal SE according to a DPP (Differential Push Full) method expressed by an expression (1), in case that the light receiving surfaces respectively corresponding to the first and fifth light detection signals S1 and S5 are arranged on one straight line including the radius of the optical record medium at positions corresponding to directions same to each other of the signal track with respect to the boundary line, and that the light receiving surfaces respectively corresponding to the second and sixth light detection signals S2 and S6 are arranged on another straight line including the radius of the optical record medium at positions corresponding to directions same to each other of the signal track with respect to the boundary line, $$SE = \{(S1+S5) \pm (S2+S6)\} \times K \pm (S3 \pm S4) \quad (1)$$

wherein K is a predetermined constant set in advance, and signs of the ±s are same to each other for each calculation.

said tracking error signal generation device further comprising:
a selecting device for selecting one of the first tracking error signal and the second tracking error signal SE on the basis of an instruction from the external, and outputting the selected signal as an output tracking error signal.

2. A tracking error signal generation device according to claim 1, wherein:
the optical record media include a first optical record medium of one type having a first track pitch and a second optical record medium of another type having a second track pitch which is substantially half of the first track pitch;
a shift amount of the first and second sub beam spots with respect to the main beam spot in a radial direction of each of the first and second optical record media is set to substantially ¼ of the first track pitch; and
said selecting device selects the first tracking error signal for the first optical record medium and selects the second tracking error signal SE for the second optical record medium on the basis of the instruction from the external.

3. A tracking error signal generation device according to claim 1, wherein:
said second operation means comprises a first switch for switching the expression (1) from one of $SE=\{(S1+S5)+(S2+S6)\} \times K+(S3+S4)$ and $SE=\{(S1+S5)-(S2+S6)\} \times K-(S3-S4)$ to the other to calculate the second tracking error signal SE;
said selecting device comprises a second switch for switching an output of said selecting device to one of the first operation means and the second operation means; and
said tracking error signal generation device further comprises a controller for generating a switch control signal on the basis of the instruction from the external, and controlling the first and second switches by the switch control signal.

4. A tracking error signal generation device according to claim 1, wherein the predetermined constant K is equal to 1.

5. A tracking error signal generation device used for an optical pickup device capable of reproducing and/or recording an information signal on a spiral or coaxial signal track of a disk shaped optical record medium of one type among a plurality of optical record media of different types which track pitches are different from each other,
said optical pickup device comprising:
a light beam irradiation means for irradiating the optical record medium with a main beam for forming a main beam spot on the signal track, a first sub beam for forming a first sub beam spot on the optical record medium ahead of the main beam spot and a second sub beam for forming a second sub beam spot behind the main beam spot;
a first light detection means having a light receiving surface D1 for receiving a reflection light of the first sub beam and outputting a first light detection signal S1 indicating a light amount received by the light receiving surface D1;
a second light detection means having at least four light receiving surfaces D2 to D5 which are divided by a first boundary line substantially parallel to a tangent direction of the signal track and by a second boundary line substantially orthogonal to the tangent direction for receiving a reflection light of the main beam and outputting second to fifth light detection signals S2 to S5 indicating light amounts received by the four light receiving surfaces D2 to D5 respectively; and
a third light detection means having a light receiving surface D6 for receiving a reflection light of the second sub beam and outputting a sixth light detection signal S6 indicating a light amount received by the light receiving surface D6,
said tracking error signal generation device comprising:
a first operation means, to which the first and sixth light detection signals S1 and S6 are inputted, for subtracting one of the first and sixth light detection signals S1 and S6 from the other to output its result as a first tracking error signal according to a three beam method; and
a second operation means, to which the second to fifth light detection signals S2 to S5 are inputted, for calculating a second tracking error signal according to a heterodyne method based on an addition signal SADD expressed by an expression (2) and a difference signal SDEF expressed by an expression (3), in case that the light receiving surfaces D2, D3, D4 and D5 are respectively disposed in second, first, third and fourth quadrants with respect to the first and second boundary lines assuming that a direction of the first boundary line corresponding to an information reading direction of the optical record medium is positive and a direction of the second boundary line corresponding to a direction from an inner circumference to an outer circumference of the optical record medium is positive to define the first to fourth quadrants, $$SADD = S2+S3+S4+S5 \quad (2)$$

$$SDEF = (S2+S5)-(S3+S4) \quad (3)$$

said tracking error signal generation device further comprising:
a selecting device for selecting one of the first and second tracking error signals on the basis of an instruction from the external, and outputting the selected signal as an output tracking error signal.

6. A tracking error signal generation device according to claim 5, wherein:
said selecting device comprises a switch for switching an output of said selecting device to one of the first operation means and the second operation means; and
said tracking error signal generation device further comprises a controller for generating a switch control signal on the basis of the instruction from the external, and controlling the switch by the switch control signal.

* * * * *